US012247436B2

(12) United States Patent
Cimo

(10) Patent No.: US 12,247,436 B2
(45) Date of Patent: Mar. 11, 2025

(54) SECURITY SYSTEM AND METHOD OF USING SAME

(71) Applicant: Alexander William Cimo, Las Vegas, NV (US)

(72) Inventor: Alexander William Cimo, Las Vegas, NV (US)

( * ) Notice: Subject to any disclaimer, the term of this patent is extended or adjusted under 35 U.S.C. 154(b) by 292 days.

(21) Appl. No.: 17/842,675

(22) Filed: Jun. 16, 2022

(65) Prior Publication Data

US 2023/0407698 A1 Dec. 21, 2023

(51) Int. Cl.

| | |
|---|---|
| ***E05G 1/10*** | (2006.01) |
| ***E05B 65/00*** | (2006.01) |
| ***E05G 1/00*** | (2006.01) |
| ***E05G 1/04*** | (2006.01) |
| ***G07C 9/00*** | (2020.01) |
| ***G08B 13/08*** | (2006.01) |

(52) U.S. Cl.

CPC ............ *E05G 1/10* (2013.01); *E05B 65/0075* (2013.01); *E05G 1/005* (2013.01); *E05G 1/04* (2013.01); *G07C 9/00174* (2013.01); *G08B 13/08* (2013.01); *G07C 2009/00769* (2013.01)

(58) Field of Classification Search

CPC .. E05G 1/005; E05G 1/04; E05G 1/10; E05B 65/0075

See application file for complete search history.

(56) References Cited

U.S. PATENT DOCUMENTS

| | | | | |
|---|---|---|---|---|
| 8,186,188 | B1 * | 5/2012 | Brown | E05G 1/005 109/45 |
| 8,854,180 | B2 * | 10/2014 | Bacarella | E05G 1/026 340/5.6 |
| 9,145,728 | B1 * | 9/2015 | LeBlanc | E05G 1/024 |
| 10,190,358 | B2 * | 1/2019 | Makke | E05G 1/005 |
| 10,253,529 | B1 * | 4/2019 | McGinn | E05G 1/005 |
| 10,991,183 | B2 * | 4/2021 | Glogovsky | E05G 1/10 |
| 11,078,687 | B2 * | 8/2021 | Mack | E05G 1/005 |
| 2009/0108988 | A1 * | 4/2009 | Cleveland | E05C 9/12 70/278.1 |
| 2011/0203328 | A1 * | 8/2011 | Vilkomirski | E05B 47/0657 70/57.1 |
| 2018/0153311 | A1 * | 6/2018 | Waggoner | E05G 1/005 |

* cited by examiner

*Primary Examiner* — Christopher J Boswell

(74) *Attorney, Agent, or Firm* — The Powers IP Law Firm

(57) ABSTRACT

A security system for storing a number of valuables. The system includes a body for holding the number of valuables, a lid coupled to the body and being movable between a closed position corresponding to the number of valuables being stored, and an open position corresponding to the number of valuables being exposed. The system includes a locking mechanism having an unlocked state corresponding to the lid being movable between closed and open positions, and a locked state corresponding to the lid being maintained in the closed position, and an interface apparatus coupled to at least one of the body and the lid. Responsive to a wireless signal from a user input device, the interface apparatus causes the locking mechanism to be moved from the locked state to the unlocked state, allowing the lid to be moved to the open position and the number of valuables to be accessed.

16 Claims, 9 Drawing Sheets

SECURITY SYSTEM AND METHOD OF USING SAME

1. FIELD OF THE INVENTION

The disclosed innovation relates to security systems and in particular to a method and apparatus for securing and tracking valuables within a container.

2. RELATED ART

Storing valuable items is inherently met with security concerns, such as theft. For example, an objective in the trading card game Yu-Gi-Oh! is to accumulate cards. Numerous other games utilized playing cards and each game has different rules. In all games, the cards can be rather valuable, in many instances on the order of thousands of dollars per card. Use of the term Yu-Gi-Oh! herein should be understood to mean any game or game cards. Players who accumulate any number of these cards are then faced with the prospect that bad actors may try to steal them. In today's art, storage of these cards and other valuables lacks security. For example, players commonly gather all of their cards and store them in cardboard or plastic boxes. Today's storage boxes present security challenges for a number of reasons. First, many of them don't have any locking mechanism at all, while the devices that have locking mechanisms which are relatively easy to bypass. Second, even for those storage boxes which have robust locking mechanisms, many are made of non-durable materials that a bad actor could easily break or bypass, should he or she desire to do so.

In addition to the ease with which bad actors can bypass storage systems which contain valuables (e.g., trading cards), today's storage systems are relatively one dimensional in that their sole function is to store and contain valuables. This is undesirable for a number of reasons. First, trading card games such as Yu-Gi-Oh! can be rather complex and involve the use of many different cards for many different reasons during a game. For this reason, tracking and monitoring the location of each card is desirable, and is not currently occurring in the prior art. Second, if a bad actor happens to steal a storage box containing a user's valuables (e.g., trading cards or other items), there is virtually no mechanism by which that user will be able to recover their storage box, other than reporting the theft to authorities. As a result, successful theft is relatively easy in today's landscape. Third, in certain trading card games (e.g., Yu-Gi-Oh!), users often have to generate lists of all of their cards prior to commencing a game. This can often take a lot of time, as many cards are used in each contest. Finally, it is common for users to have many different storage boxes, each containing valuables (e.g., trading cards). In today's art, there is virtually no mechanism by which valuables in each of the different storage boxes can be organized As such, there is room for improvement in security systems for storing valuables, and in methods of using security systems.

SUMMARY

In accordance with non-limiting embodiment of the disclosed concept, a security system is for storing a number of valuables. The system includes a body for holding the number of valuables, a lid coupled to the body and being movable between a closed position corresponding to the number of valuables being stored, and an open position corresponding to the number of valuables being exposed, a locking mechanism having an unlocked state corresponding to and allowing the lid to be movable between closed and open positions, and a locked state corresponding to the lid being maintained in the closed position, and an interface apparatus coupled to at least one of the body and the lid. Responsive to a wireless signal from a user input device, the interface apparatus causes the locking mechanism to be moved from the locked state to the unlocked state, thereby allowing the lid to be moved to the open position and the number of valuables to be accessed.

In accordance with another non-limiting embodiment of the disclosed concept, a security system for storing a number of valuables comprises a body for holding the number of valuables, a lid coupled to the body and being movable between a closed position corresponding to the number of valuables being stored, and an open position corresponding to the number of valuables being exposed, a locking mechanism having an unlocked state corresponding to the lid being movable between closed and open positions, and a locked state corresponding to the lid being maintained in the closed position. The locking mechanism is movable between the locked state and the unlocked state without a mechanical mechanism, such as via wireless signal.

In accordance with yet a further embodiment of the disclosed concept, a method of using a security system comprises the steps of providing a body for holding a number of valuables and providing a lid coupled to the body. The lid is movable between a closed position corresponding to the number of valuables being stored, and an open position corresponding to the number of valuables being exposed. Also provided is a locking mechanism having an unlocked state corresponding to the lid being movable between closed and open positions, and a locked state corresponding to the lid being maintained in the closed position. The security system is paired with a software application on a primary user input device.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention.

DETAILED DESCRIPTION

Figure 1:
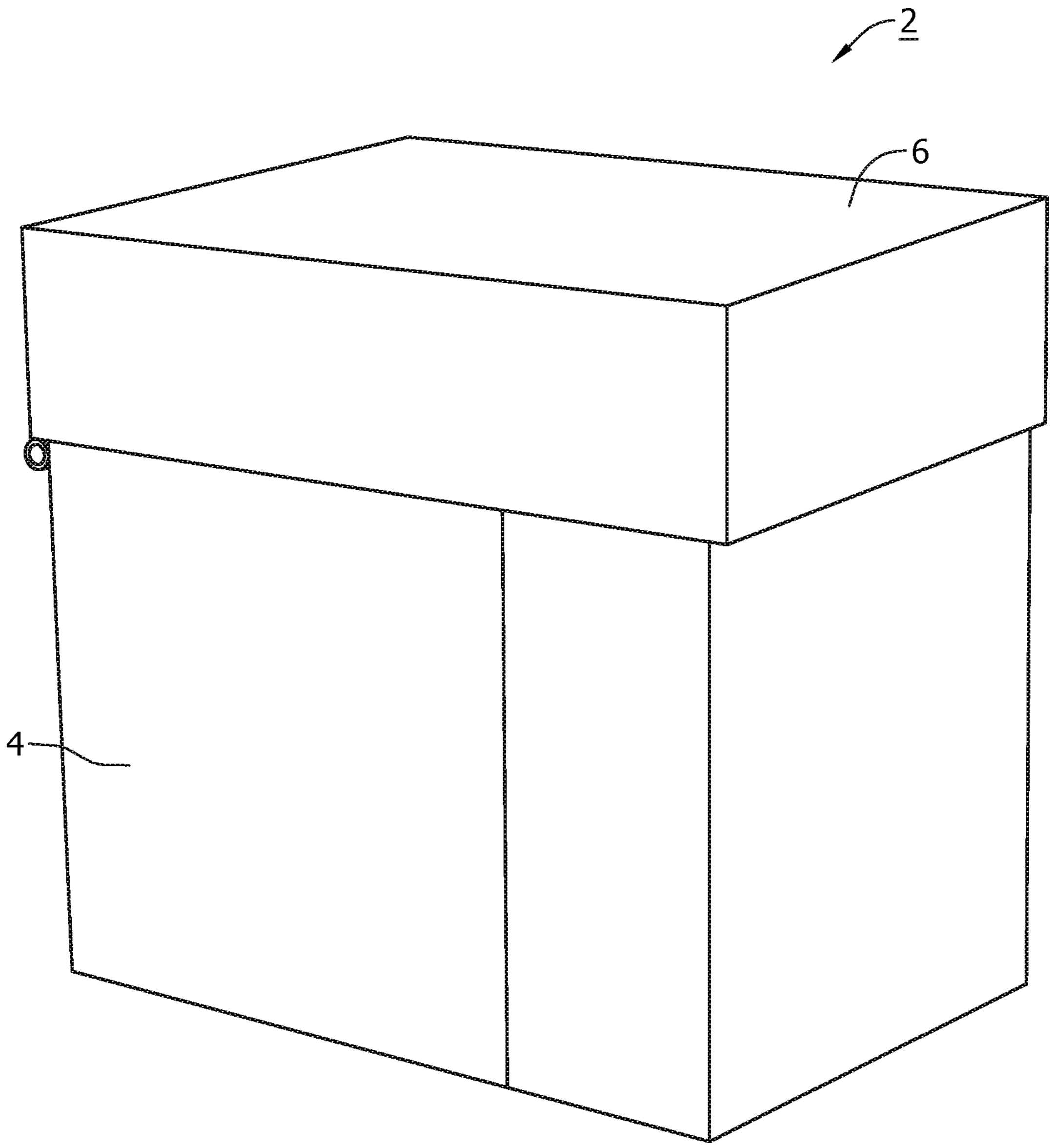
FIG. 1 and FIG. 2 are different isometric views of a security system for storing a number of valuables, shown with a lid in a closed position, in accordance with one non-limiting embodiment of the disclosed concept.
Figure 2:
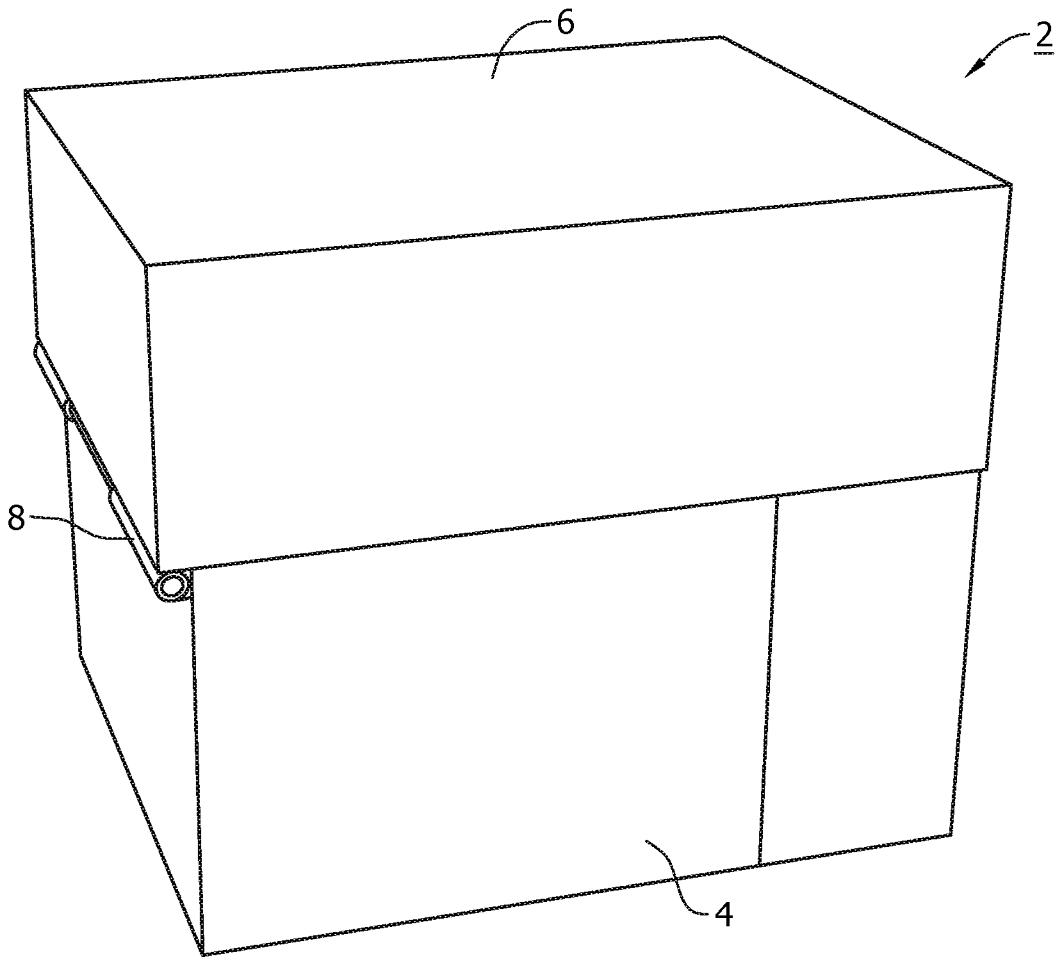
Figure 3:
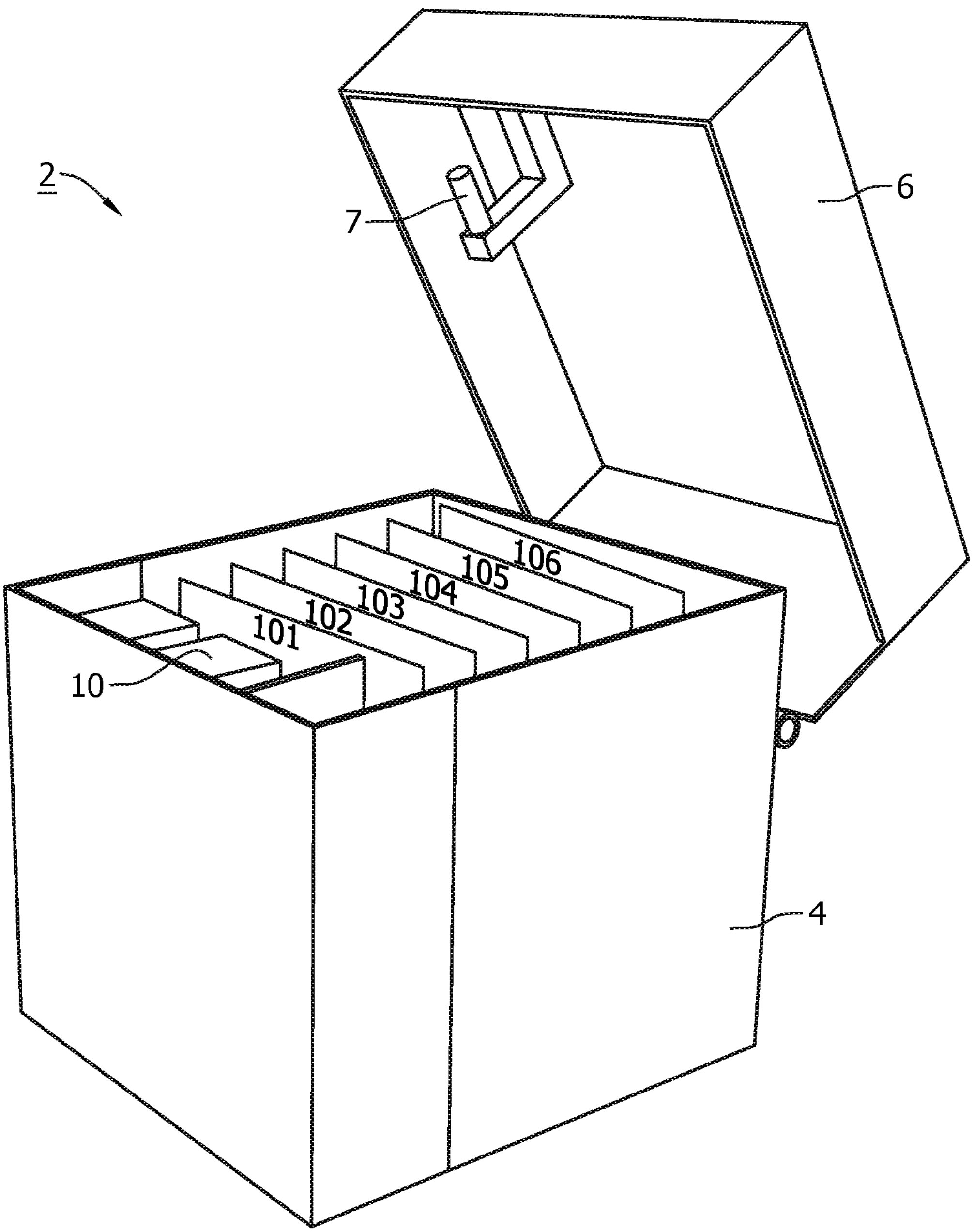
FIG. 3 and FIG. 4 are different isometric views of the security system of FIGS. 1 and 2, shown with the lid in an open position.

FIGS. 1-4 show a security system 2 for storing a number of valuables (e.g., playing cards 100,101,102,103,104,105, shown in FIG. 3), in accordance with one non-limiting embodiment of the disclosed concept. The security system may hold any number of cards and in one embodiment, the number of cards that may be stored may be up to 120 cards. In other embodiments are greater or fewer number of cards may be stored. The security system 2 includes a body 4 having a containing space 5 for holding playing cards 100,101,102,103,104,105, a lid 6 coupled to body 4. In one embodiment the body is between 3" to 5" in height, width, and depth although in other embodiment the dimensions my vary to suit the dimensions of the items to be stored. The lid 6 is movable between a closed position corresponding to playing cards 100,101,102,103,104,105 being stored, and an open position corresponding to playing cards 100,101,102, 103,104,105 being exposed. The body 4 and the lid 6 are coupled to one another at a hinge 8 (shown in FIG. 2). It will, however, be appreciated that a suitable alternative lid and body could be coupled by a mechanism other than a hinge.

Security system 2 also includes a locking mechanism 10 having an unlocked state corresponding to lid 6 being movable between closed and open positions, and a locked state corresponding to lid 6 being maintained in the closed position. In one example embodiment, lid 6 has a latching member 7, and locking mechanism 10 includes at least one solenoid 11 configured to engage latching member 7 in order to maintain lid 6 in a closed position, with respect to body 4. That is, the interface between latching member 7 and solenoid 11 determines whether lid 6 is maintained in the closed position, or is otherwise movable to the open position.

Figure 4:
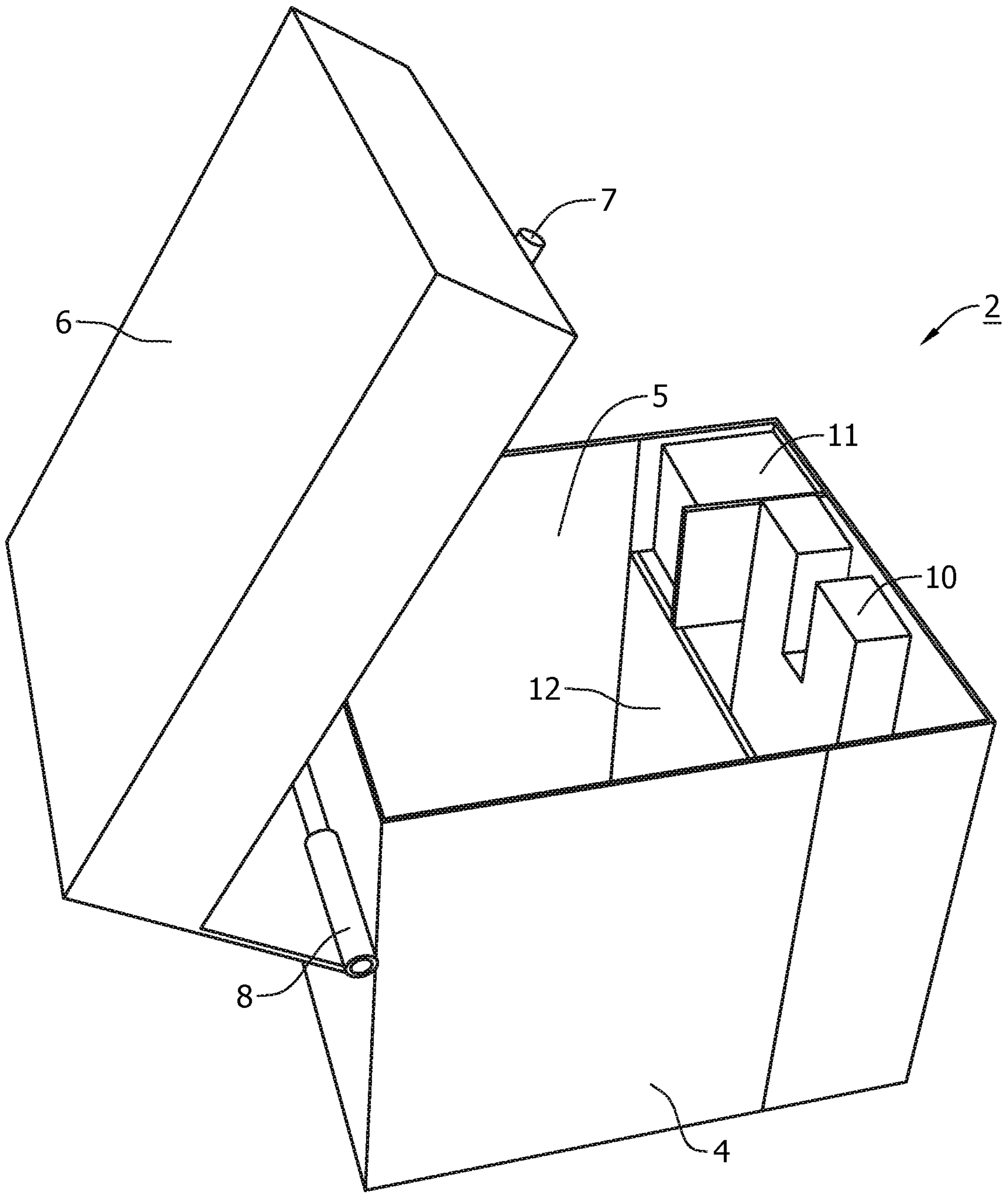
Figure 7:
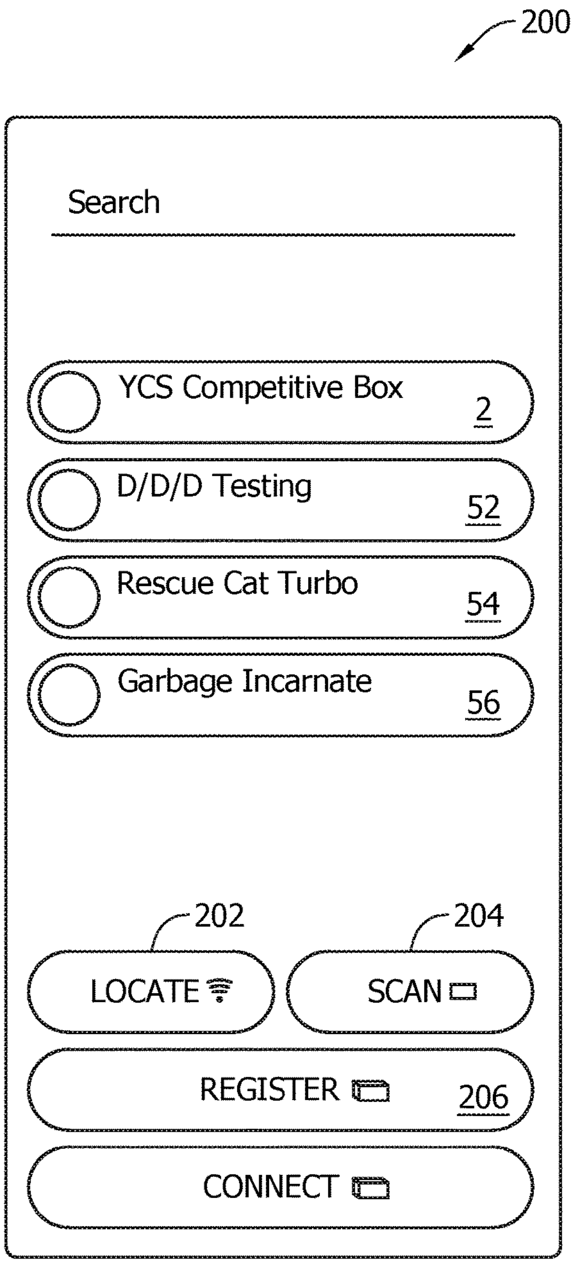
FIG. 7 and FIG. 8 are exemplary screenshots of a software application on a phone to be used with the security system of FIGS. 1-4.
Figure 8:
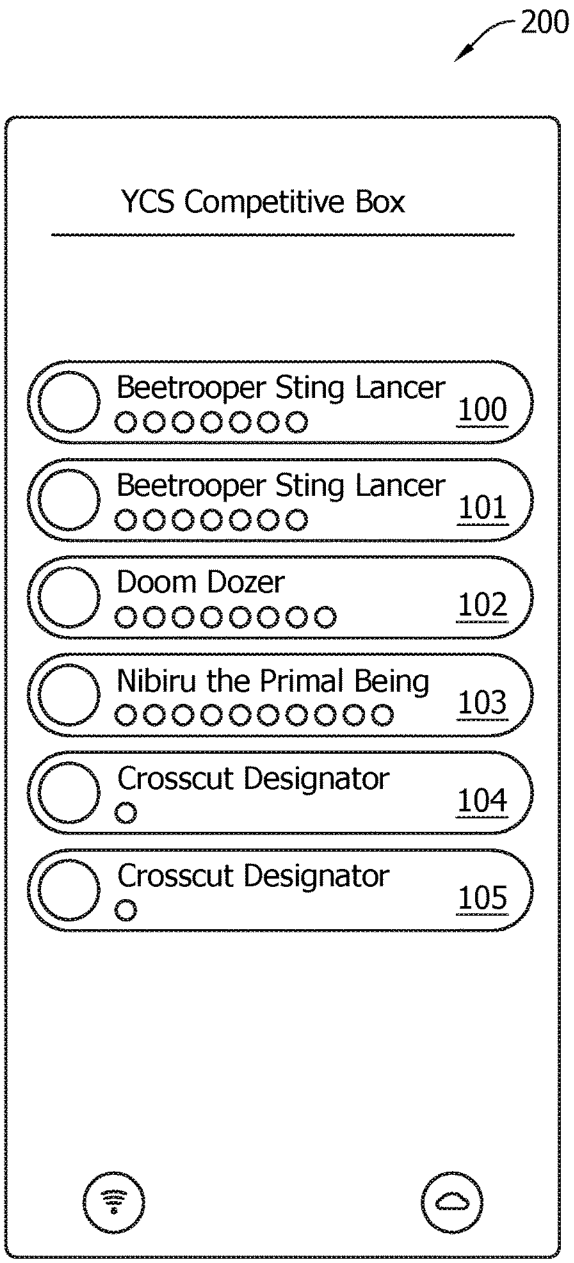

Additionally, as shown in FIG. 4, body 4 includes a compartment 12, and coupled to or disposed within compartment 12 is an interface apparatus 20 for allowing security system 2 to interface with a user input device (e.g., phone 200, screenshots of which are shown in FIGS. 7 and 8). Interface apparatus 20 and locking mechanism 10 may be located on a first side of containing space 5, and hinge 8 may be located on a second, opposite side of the containing space 5. As will be discussed in greater detail below, responsive to a wireless signal from a user input device (e.g., phone 200), interface apparatus 20 causes locking mechanism 10 to be moved from the locked state to the unlocked state, thereby allowing lid 6 to be moved to the open position (FIGS. 3 and 4) and the number of valuables 100,101,102,103,104,105 to be accessed. In one example embodiment, as will be discussed below, the solenoid 11 is electrically connected to interface apparatus 20 in order to allow lid 6 to move between locked and unlocked states. It is also contemplated that the locking mechanism/solenoid may be entirely housed within the locking mechanism 10 using an electronic latch. Accordingly, locking mechanism 10 is movable between the locked state and the unlocked state without a mechanical mechanism. In addition, a mechanical mechanism may be provided to manually lock and/or unlock the housing, such as with a physical key.

Figure 5:
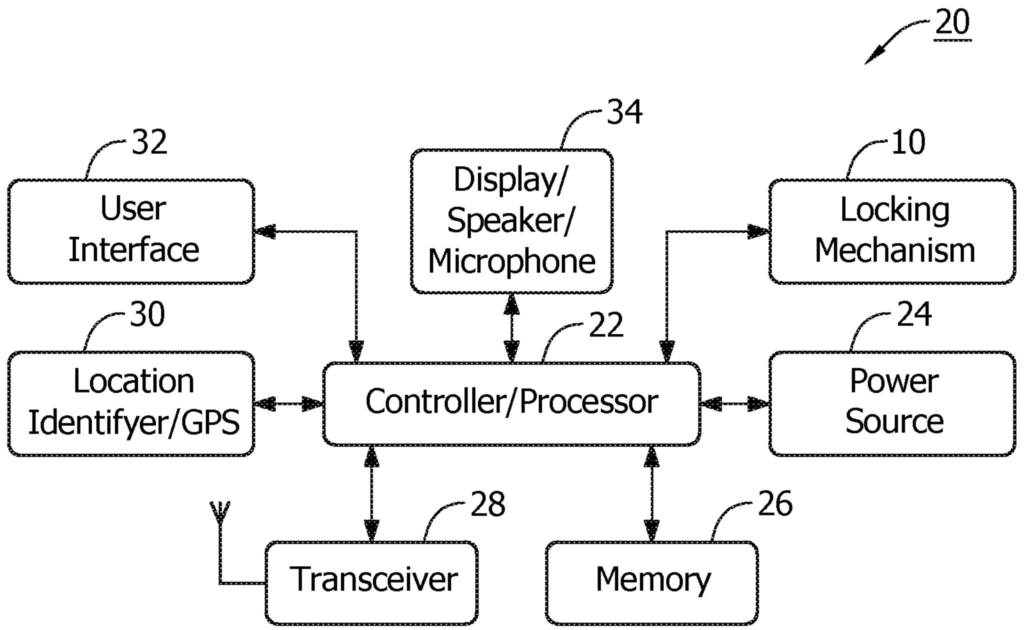
FIG. 5 is a schematic view of an interface apparatus for the security system of FIGS. 1-4.

Referring to FIG. 5, an interface apparatus 20 will now be discussed in greater detail. As shown, the interface apparatus 20 includes a controller 22, a power source (e.g., battery 24) electrically connected to the controller 22 and being configured to power the controller 22, and the memory device 26 and transceiver 28, each of which is electrically connected to the controller 22. The memory is configured to store application software in a non-transitory state to be read by the controller (processor) for execution. Furthermore, the interface apparatus 20 includes a location identifier 30, a user interface 32, and a speaker 34 each electrically connected to the controller 22. The location identifier 30 is configured to relay a GPS location of security system 2 to phone 200, as will be discussed below. In other embodiment, any type of location identifier or sensor may be used including, but not limited to, proximity sensor, Bluetooth, GPS, cell tower or Wi-Fi based location determination, or any other type location or tracking system. The speaker 34, as will be discussed in greater detail below, is configured to emanate a sound (such as a beeping, voice output, or siren) indicating that the security system 2 and the phone 200 are at least a predetermined distance apart. Furthermore, it will be appreciated with reference to FIG. 5 that the controller 22 and the battery 24 may each be electrically connected to the locking mechanism 10. As such, in operation, the interface apparatus 20 is configured to move the locking mechanism 10 between locked and unlocked states responsive to a control signal from phone 200. The control signal may be transmitted wirelessly, or any other manner known or develop in the future. Specifically, the transceiver 28 is configured to receive the wireless signal from the phone 200 in order to allow the locking mechanism 10 to subsequently be moved. Additionally, in one example embodiment the interface apparatus 20 can be understood as being a self-contained subassembly separately coupled to the body 4.

Figure 6:
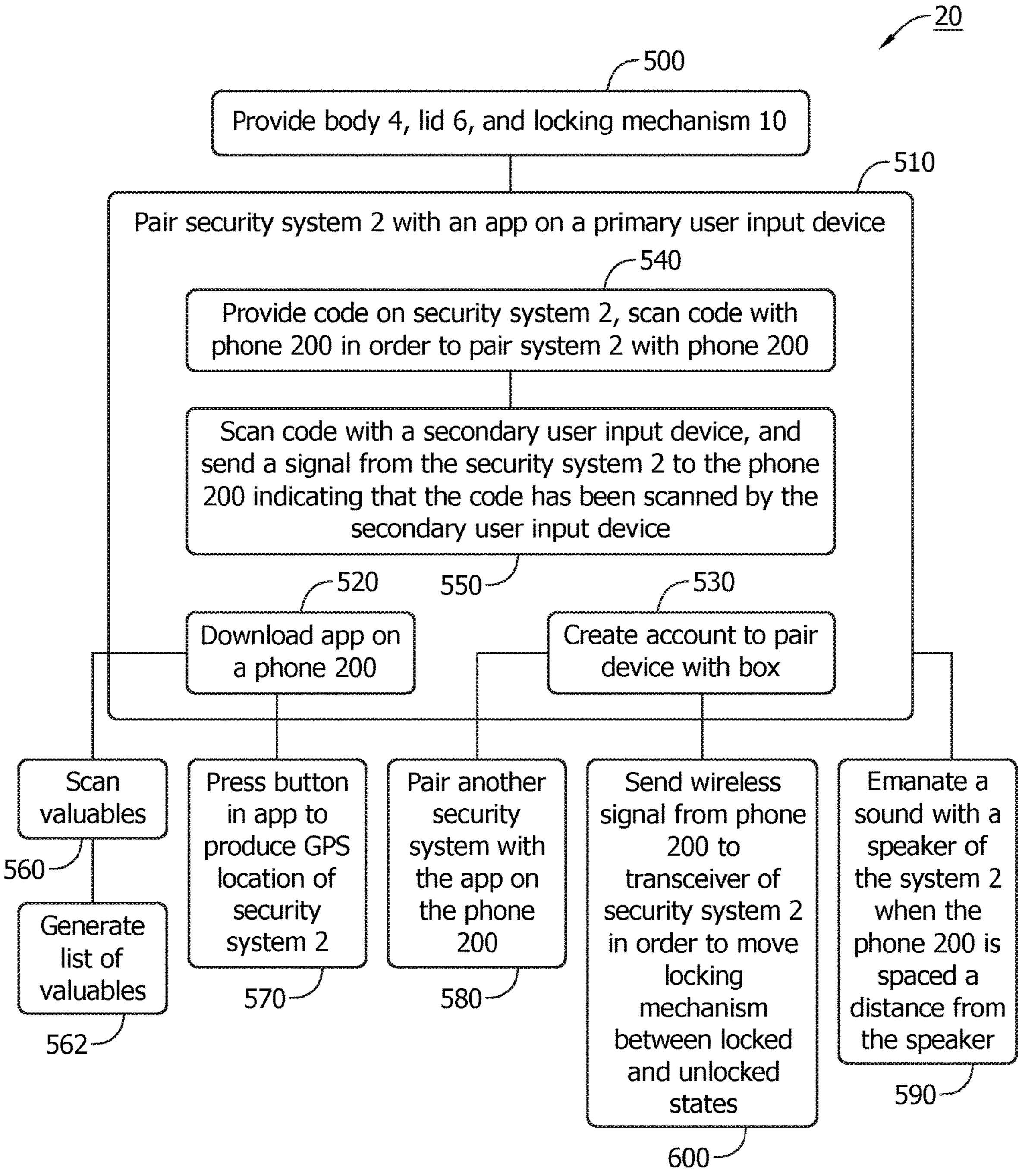
FIG. 6 is a flow chart showing an example method of using the security system of FIGS. 1-4.

Referring to FIG. 6, an example method of using security system 2 will now be described. The method can generally be understood as including a first step 500 of providing body 4, lid 6, and locking mechanism 10, and a second step 510 of pairing security system 2 with a software application on a primary user input device (e.g., phone 200, tablet, smartwatch, or dedicated computer device). In order to pair security system 2 with phone 200, in one example embodiment a user may perform a step 520 of downloading a software application on phone 200, and a step 530 of creating an account in the software application to pair phone 200 with security system 2. More specifically, and as shown in FIG. 6, the pairing step 510 further includes a step 540 of providing a code on security system 2 and scanning the code with phone 200 in order to pair phone 200 with system 2. As an added layer of security, after the step 540, if a user of a second user input device scans the code, a signal is sent from security system 2 to phone 200 indicating that the code has been scanned by the second user input device, as indicated at step 550. This will indicate to the user of phone 2 that someone else is trying to access security system 2, thereby giving them an indication of any wrongdoing or of a third party attempting to gain access. As will be discussed below, when security system 2 is paired with phone 200, or another user input device such as a tablet, many different capabilities can be realized.

For example, each of the playing cards 100,101,102,103, 104,105 can be scanned by phone 200 in order to register the cards 100,101,102,103,104,105 with phone 200, and a list of all the playing cards 100,101,102,103,104,105 (e.g., or other valuables) can be generated, as indicated in steps 560,562. See also, for example, FIG. 8, which represents a listing of each individual playing card 100,101,102,103,104,105 contained within security system 2. It is also contemplated that the security system container may have a scanner built in such that as a card is placed in the box or passed through a slot, the card can be scanned and registered with the application software. It is also contemplated that the camera of the phone or other smart device may be used to 'scan' the card. A separate card scanner could be used as well to determine which card is being scanned 'into' the housing or into a deck. Or an updatable database may be part of the software such that the database contains a list and details of each card, and the user can add, check off, or otherwise select which cards are in the box from the list of cards in the database to create decks of cards that are in the housing. Users thus may have the option of scanning the cards, or manually selecting cards from a database list, based on which cards are placed in the housing or form a deck.

Generating this list is advantageous because before certain card games are played, such as Yu-Gi-Oh!, players must submit lists of all of their cards that they will use. In any given game, the number of cards being played can be rather extensive. As such, having a relatively simple and straightforward mechanism, provided by phone 200 and security system 2, of generating such a list is particularly advantageous. This method also provides an efficient and accurate way for players to monitor and track cards, including which box includes which cards. It is contemplated that more than one 'deck' of cards may be created and stored in one or more different security boxes.

Another advantage of using phone 200 and security system 2 can be appreciated with reference to step 570, wherein after the pairing step 510, a button in the application software executing on the phone 200 (or tablet or other computing device) can be pressed in order to produce a location of the security system 2 containing the cards. The location may be displayed on a map, or by distance and direction. When the button in the software is pressed, a wireless signal is sent to security system 2 and is received at the transceiver 28, which is electrically connected to location identifier 30. In turn, through the transceiver 28, the location identifier 30 relays the GPS location of the security system 2 to the phone 200. As a result of this capability, users can monitor the location of the security system 2, and can guard against theft. For example, if a user realizes he or she has misplaced the security system 2, or believes it has been stolen, he or she can press a button shown in the screen by the application software executing on the phone 200 and know exactly where it is in the manner just described. In the event that the user believes it is stolen, this information can significantly improve the likelihood that police officers or other authorities will be able to retrieve it.

The application software may also be configured to provide an alert or alarm to the user (and optionally at the security system box itself) when the security system box is outside of a set proximity to the user. The alert or alarm may be issued by the user's computing device, such as a smartwatch, smartphone, tablet, or a dedicated fob associated with the security system. The proximity may be set by the user, such as 10 feet, 20 feet, or any other distance. This alerts the user if a third party were to walk away with security system with the user's knowledge.

Continuing to refer to FIG. 6, a step 580 is provided after pairing step 510, in which another security system is paired with the software application on the phone 200. It will be appreciated that the other security system may be configured the same as the security system 2. In this manner, users are provided with the ability to track, organize, and monitor multiple security systems on their devices (e.g., phone 200). See, for example and without limitation, FIG. 7, which shows the security system 2 and a plurality of other security systems 52, 54, 56 represented in a main page of the software application of the phone 200. It will be appreciated that if a user clicks on a button for one of the security systems 2, 52, 54, 56 in the software application, the user will be taken to another screen. See FIG. 8 for example, which represents another screen having the contents of the security system 2 (e.g., playing cards 100,101,102,103,104, 105). Different housing may store different cards.

As an additional layer of security, a step 590 in FIG. 6 is provided in which an audible sound may be emanated with the speaker 34 when phone 200 is spaced or located a predetermined distance from the speaker. This capability is desirable at least in the event that security system 2 is stolen. For example, if the security system 2 is in proximity to its user and its user's phone (e.g., phone 200), and a bad actor grabs and begins to take security system 2 away from the user, once the security system 2 gets spaced a predetermined distance (e.g., 15 meters or any other distance), a loud audible sound may be emanated from speaker 34 of the container and/or phone 200. This sound will alert the user and others nearby that his or her security system has been taken. The sound may be a voice that screams ("container being stolen—call this phone number or call police"). Furthermore, in one example embodiment, the software of the security system 2 is configured such that many different audible sounds can be emanated from speaker 34, depending on what its user prefers to hear for alerting purposes. Alerts may also be sent via text or email to any location provide notice of the theft.

Finally, in accordance with the disclosed concept, the method further includes a step 600 of sending a wireless signal (or any other type connection or signal) from the phone 200 to the security system 2 in order to the move or transition the locking mechanism 10 between locked and unlocked states. More specifically, the wireless signal from the phone 200 may be received at the transceiver 28 and be processed at the controller 22, which is electrically connected to the locking mechanism 10. In one example embodiment, an electrical signal is sent from the controller 22 to a solenoid 11 after receipt at the transceiver 28. The solenoid 11 has a plunger, rod, pin, or any other structure, which in turn is moved between positions in order to allow the latching member 7 of the lid 6 to be disengaged, thereby allowing the lid to open and the playing cards 100 to be accessed. In one embodiment, all the locking components are contained or housed within the locking mechanism. Thus, it will be appreciated that the security system 2 can move between positions without a traditional key or other mechanical mechanism, but instead via a user input device such as using the phone 200. A traditional key or code via touch pad may be provided on the box as well to allow access in the event or a dead battery or software glitch.

Also part of the method of FIG. 6 are additional features which may be selectively or optionally added to the security system. For example, the security system may maintain continual or periodic communication with the user phone to verify that the security system is still in range or within a certain distance of the phone (or other user computing device). This range may be determined by Bluetooth range, signal strength determination, or any other method or system to determine distance between two devices. If the range between the security system and the phone exceed a predetermined amount, then a notification can be sent to one or more devices, such as but not limited to the paired device. This alerts the users and possibly other that the device is out of range such as due to the security system mistakenly being left behind or stolen.

In addition, the housing of the security system may be configured with a code, such as a QR code, bar code, numeric number code, or any other type code, on the outside of the housing that allows a person to scan with a computing device (phone or tablet) or enter the code at a web site if the security system (housing) is found. Thus, if the housing is lost, and then found, the code can be scanned and the code will lead the person filing the housing to the owner, such as providing a phone number or other contact information for the rightful owner.

As discussed above, FIG. 7 represents a screenshot of a user interface (GUI) shown by the software application on the phone 200 associated with security systems (e.g., system 2), in accordance with the disclosed concept. As shown, the software application on the phone 200 has, in addition to buttons for security systems 2, 52, 54, 56, a first button 202, a second button 204, and a third button 206 (shown on a touch screen). When first button 202 is pressed, as discussed above, a wireless signal is sent to the corresponding security system (e.g., system 2) in order to determine a GPS location. When second button 204 is pressed, any one of playing cards 100, 101, 102, 103, 104, 105, and/or other valuables may be scanned with a camera of the phone 200. When this is done, each of the playing cards 100, 101, 102, 103, 104, 105 is populated into the software application and then can be registered by pressing third button 206. Subsequently, playing cards 100, 101, 102, 103, 104, 105 can be viewed in the software application by pressing the button associated with the corresponding security system. See for example FIG. 8, which represents the contents of the security system 2, and is viewable in the software application after the button in FIG. 7 is pressed that represents the security system.

Figure 9A:
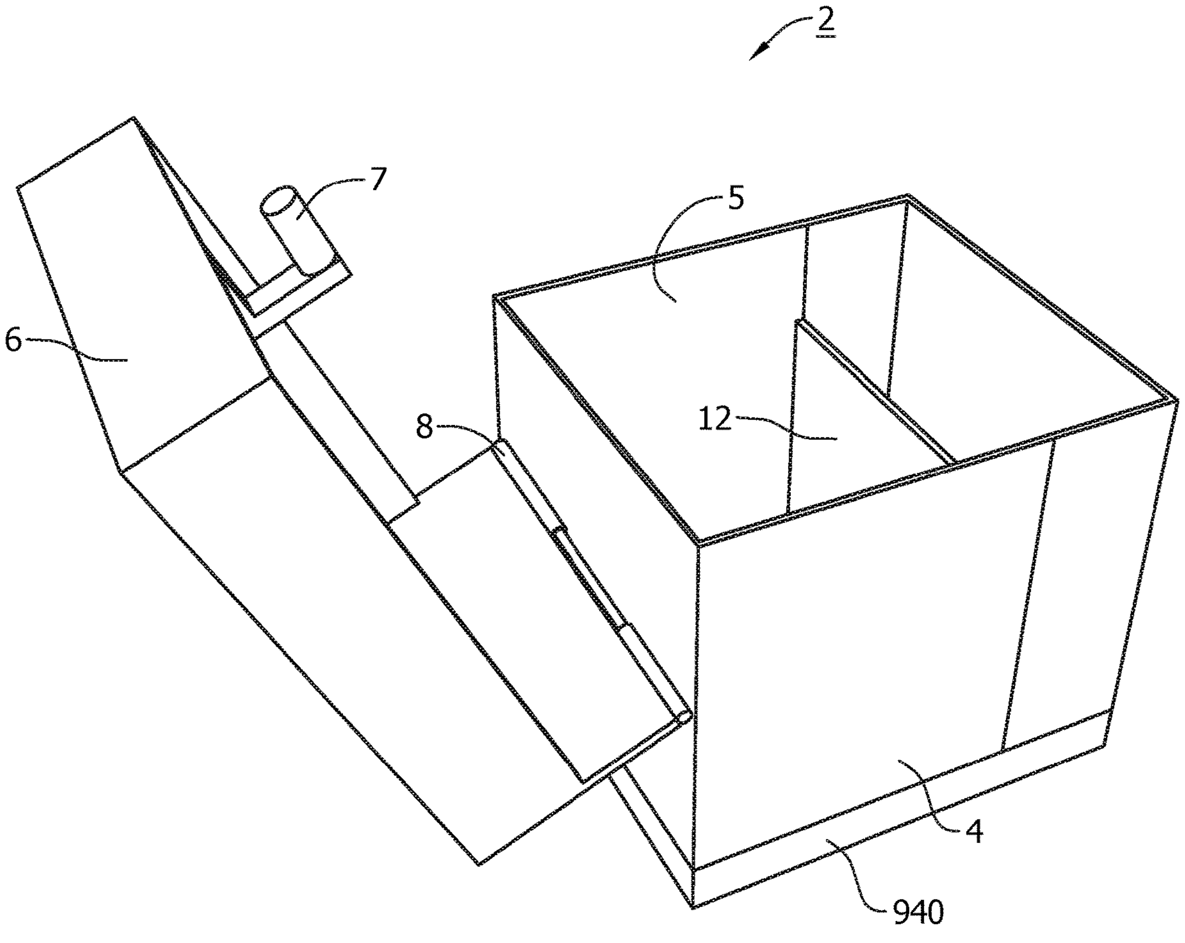
FIG. 9A and FIG. 9B illustrates perspective views of an optional detachable tray associated with the housing.
Figure 9B:
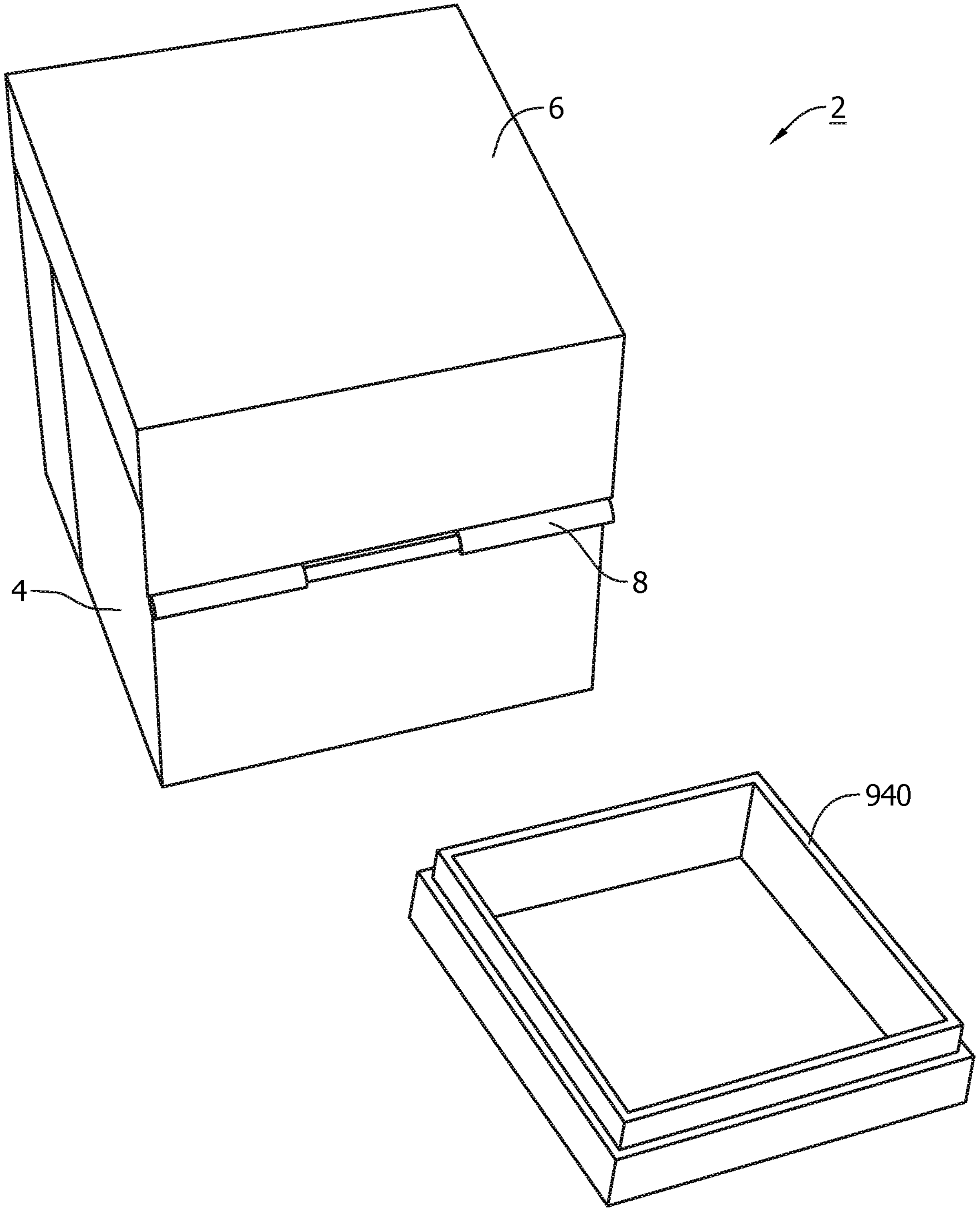

FIG. 9A and FIG. 9B illustrates perspective views of an optional detachable tray associated with the housing. As compared to the other figures, identical elements are labeled with identical reference numbers. As shown, in this embodiment a detachable or movable tray 940 is provided that is configured to store one or more optional game elements, such as dice, rules books, counters, token, pieces, or any other items that the user would like to associate with the housing. The tray 940 may be secured to the housing with magnets such that the tray mounts flush with the bottom, or the tray may be slidable into and out of a space at the bottom of the housing. In one embodiment, the tray 940 may be held in place by small magnets which are strong enough to not come undone by moving the security system, but weak enough that when pulled with force, will remove the tray from the housing until the user re-attaches it once finished with their game session. It is also contemplated that the tray 940 or storage compartment may be located at other locations in relation to the housing.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A security system for storing a number of valuables, the system comprising:

a body for holding the number of valuables;

a lid coupled to the body and being movable between a closed position corresponding to the number of valuables being stored, and an open position corresponding to the number of valuables being exposed;

a locking mechanism having an unlocked state corresponding to the lid being movable between closed and open positions, and a locked state corresponding to the lid being maintained in the closed position; and an interface apparatus coupled to at least one of the body and the lid, the interface apparatus comprising a controller electrically connected to the locking mechanism, a speaker electrically connected to the controller, and a location identifier electrically connected to the controller, wherein, responsive to a wireless signal from a user input device, which is separate from the security system, via a software application installed on the user input device, the interface apparatus causes the locking mechanism to be moved from the locked state to the unlocked state, thereby allowing the lid to be moved to the open position and the number of valuables to be accessed, wherein the location identifier is configured to transmit a location of the security system to the user input device via the software application, and the speaker is configured to emanate an audible sound via the software application when the security system and the user input device are separated by greater than a predetermined distance or when a wireless signal between the security system and the user input device has a signal strength below a predetermined threshold.

2. The system according to claim 1, wherein the interface apparatus further comprises a transceiver for receiving the wireless signal from the user input device, the transceiver being electrically connected to the controller.

3. The system according to claim 2, wherein the interface apparatus further comprises a battery power source electrically connected to the controller, the power source being configured to power the controller.

4. The system according to claim 2, wherein the interface apparatus further comprises a memory electrically connected to the controller, the memory configured with machine executable code.

5. The system according to claim 1, wherein the locking mechanism comprises at least one solenoid electrically connected to the interface apparatus, the solenoid controllable to establish the lid into the locked and unlocked states.

6. The system according to claim 5, wherein the lid further comprises a latching member, and wherein the at least one solenoid has a locking member configured to interface with the latching member in order to allow the lid to move between the locked and unlocked states.

7. The system according to claim 1, wherein the number of valuables are a number of cards, and wherein the system further comprises a scanner configured as part of the system to scan the cards which are stored in the system such that as the cards are placed into the body, the cards are scanned and registered with the software application.

8. The system according to claim 1, wherein the location identifier comprises Bluetooth.

9. The system according to claim 1, further comprising a detachable tray associated with the body for storing one or more game elements.

10. The system according to claim 9, wherein the tray is secured to the body via magnets.

11. A security system for storing a number of cards, the system comprising:

a body for holding the number of cards;

a lid coupled to the body and being movable between a closed position corresponding to the number of cards being stored, and an open position corresponding to the number of cards being exposed;

a controller with a wireless interface, the wireless interface configured to receive a wireless signal from a user input device;

a locking mechanism in communication with the controller, having an unlocked state corresponding to the lid being movable between closed and open positions, and a locked state corresponding to the lid being maintained in the closed position, wherein the locking mechanism is movable between the locked state and the unlocked state responsive to a wireless signal from the user input device to the controller with the wireless interface, the wireless signal received from a software application executing on the user input device, and wherein the system further comprises a scanner configured to scan the cards which are stored in the system such that as the cards are placed into the body, the cards are scanned and registered with the software application.

12. The system according to claim 11, wherein the body has a containing space for holding the number of valuables, wherein the lid is connected to the body at a hinge, wherein the locking mechanism is disposed on a first side of the containing space, and wherein the hinge is disposed on a second, opposite side of the containing space.

13. The system according to claim 11, further comprising a location identifier electrically connected to the controller, and wherein the location identifier comprises Bluetooth.

14. The system according to claim 11, further comprising a detachable tray associated with the body for storing one or more game elements.

15. The system according to claim 14, wherein the tray is secured to the body via magnets.

16. The system according to claim 11, further comprising a speaker electrically connected to the controller and configured to emanate an audible sound via the software application when the security system and the user input device are separated by greater than a predetermined distance or when a wireless signal between the security system and the user input device has a signal strength below a predetermined threshold.

* * * * *